(12) United States Patent
Qian et al.

(10) Patent No.: US 9,647,407 B1
(45) Date of Patent: May 9, 2017

(54) QUASI-PARAMETRIC CHIRPED-PULSE AMPLIFIER

(71) Applicant: Shanghai Jiao Tong University, Shanghai (CN)

(72) Inventors: Liejia Qian, Shanghai (CN); Jingui Ma, Shanghai (CN); Jing Wang, Shanghai (CN); Peng Yuan, Shanghai (CN); Guoqiang Xie, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 14/954,843

(22) Filed: Nov. 30, 2015

(30) Foreign Application Priority Data

Nov. 11, 2015 (CN) .......................... 2015 1 0767075

(51) Int. Cl.
| | |
|---|---|
| *G02F 1/37* | (2006.01) |
| *H01S 3/109* | (2006.01) |
| *G02F 1/39* | (2006.01) |
| *H01S 3/00* | (2006.01) |
| *H01S 3/11* | (2006.01) |
| *H01S 3/23* | (2006.01) |
| *G02F 1/355* | (2006.01) |

(Continued)

(52) U.S. Cl.
CPC .......... *H01S 3/0057* (2013.01); *G02F 1/3551* (2013.01); *G02F 1/37* (2013.01); *G02F 1/39* (2013.01); *H01S 3/109* (2013.01); *H01S 3/1103* (2013.01); *H01S 3/1307* (2013.01); *H01S 3/1673* (2013.01); *H01S 3/2316* (2013.01); *G02F 2001/392* (2013.01); *H01S 3/1611* (2013.01); *H01S 3/1625* (2013.01); *H01S 3/1636* (2013.01); *H01S 3/1643* (2013.01)

(58) Field of Classification Search
CPC ........ G02F 1/37; G02F 1/39; G02F 2001/392; H01S 3/0057; H01S 3/109; H01S 3/1103; H01S 3/1307; H01S 3/1673; H01S 3/2316
See application file for complete search history.

(56) References Cited

U.S. PATENT DOCUMENTS

| | | | |
|---|---|---|---|
| 5,400,350 A * | 3/1995 | Galvanauskas ....... | H01S 3/0057 372/102 |
| 6,728,273 B2 * | 4/2004 | Perry .................... | B23K 26/12 359/330 |

(Continued)

FOREIGN PATENT DOCUMENTS

CN 103872568 A * 6/2014 ............. H01S 3/105

OTHER PUBLICATIONS

J. Moses et al., "Conformal profile theory for performance scaling of ultrabroadband optical parametric chirped pulse amplification," J. Opt. Soc. Am. B 28, 812 (2011).

*Primary Examiner* — Daniel Petkovsek
(74) *Attorney, Agent, or Firm* — Mei & Mark LLP; Manny Li

(57) ABSTRACT

Quasi-parametric chirped-pulse amplifier comprising a signal path, a pump path, and an amplifier. A dedicated nonlinear crystal doped with rare-earth-ions is used which has strong absorption around the idler waveband. Both the chirped signal pulse and the pump pulse incident into the amplifier, where energy continuously transfers from the pump pulse to the signal pulse and a newly generated idler pulse. The energy of the generated idler pulse is continually absorbed by the rare-earth ions doped in the amplifier.

5 Claims, 5 Drawing Sheets

(51) Int. Cl.
*H01S 3/13* (2006.01)
*H01S 3/16* (2006.01)

(56) References Cited

U.S. PATENT DOCUMENTS

| | | | | |
|---|---|---|---|---|
| 6,870,664 B2 * | 3/2005 | Jovanovic | ............... | G02F 1/39 |
| | | | | 330/4.5 |
| 6,873,454 B2 * | 3/2005 | Barty | ............... | G02F 1/39 |
| | | | | 359/330 |
| 7,907,332 B2 * | 3/2011 | Kondo | ............... | G02F 1/3532 |
| | | | | 359/330 |
| 8,922,873 B2 * | 12/2014 | Powers | ............... | G02F 1/39 |
| | | | | 359/330 |

* cited by examiner

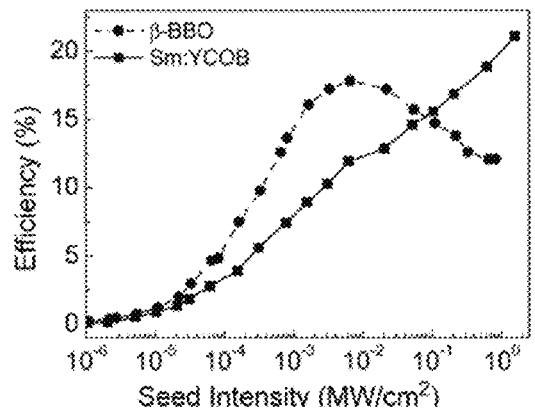
Fig. 4(a)
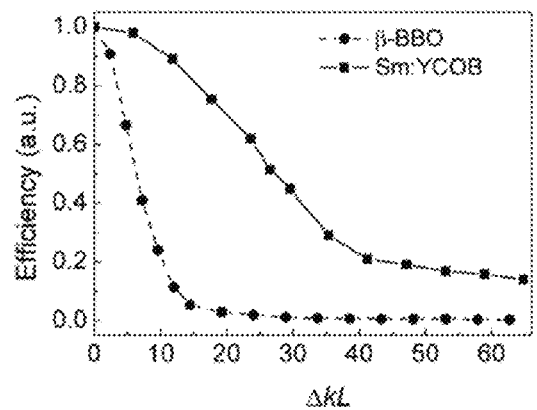
Fig. 4(b)
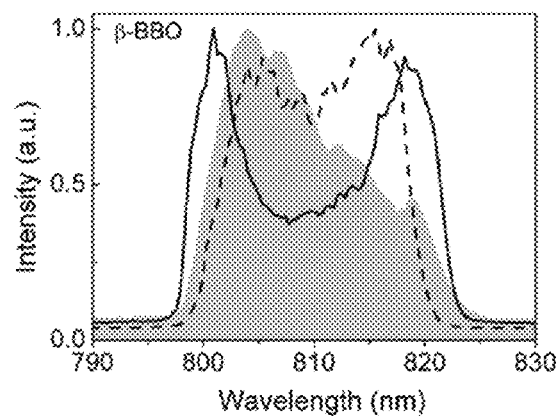
Fig. 4(c)
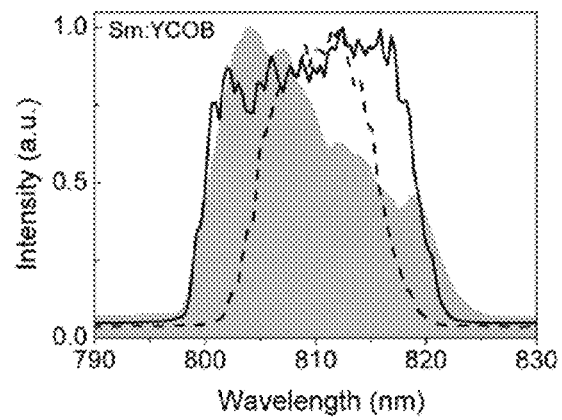
Fig. 4(d)
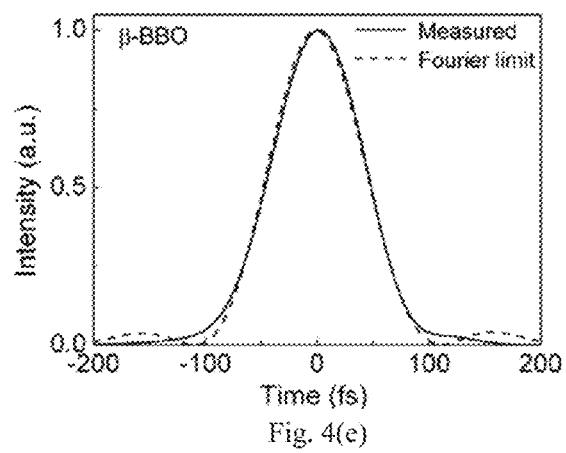
Fig. 4(e)
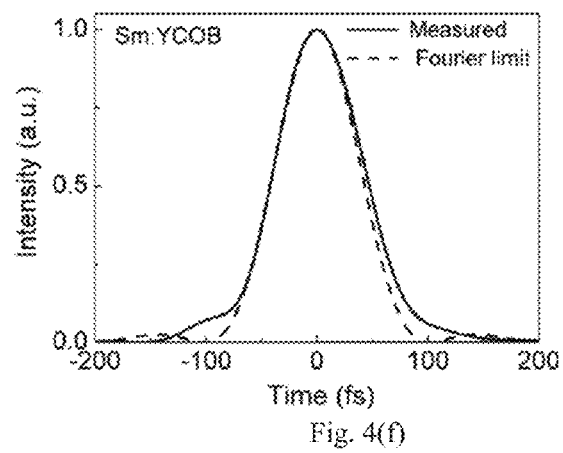
Fig. 4(f)
FIGURE 4

QUASI-PARAMETRIC CHIRPED-PULSE AMPLIFIER

CROSS-REFERENCE AND RELATED APPLICATIONS

The subject application claims priority on Chinese patent application CN201510767075.7 filed on Nov. 11, 2015. The contents and subject matter of the Chinese priority application is incorporated herein by reference.

FIELD OF INVENTION

The present invention relates to ultrafast laser amplification, and more particularly, to a quasi-parametric chirped-pulse amplifier.

BACKGROUND OF THE INVENTION

Currently, intense chirped-pulse amplification lasers rely on two distinct types of optical amplifiers: optical parametric amplifiers (OPA) and conventional laser amplifiers. The OPA is superior to the energy-level laser amplification in terms of gain bandwidth; its combination with the chirped-pulse amplification is a promising technology for ultra-high peak power lasers. The exciting outcome is the opportunity to reach high peak powers close to a petawatt and generate few-cycle pulses with tens of millijoules of energy. However, the back-conversion effect, which is encountered in all parametric processes, places a ceiling on the future success of the chirped-pulse OPA scheme. First, the back-conversion effect fundamentally limits the conversion efficiency. Although there have been considerable efforts to mitigate the back-conversion effect in the chirped-pulse OPA, high conversion efficiency close to the theoretical limit (i.e., complete pump depletion) is impossible in principle. To date, a maximum efficiency of 34% has been demonstrated using the intricate technique of spatiotemporal pulse shaping, but conversion efficiencies are typically limited to around 20%. Second, because of the back-conversion effect, OPA devices are highly sensitive to the phase-matching condition and uniformity of the pump intensity. Such OPA characteristics place strict requirement on the pump beam quality and challenge the scalability of the chirped-pulse OPA to higher peak-powers beyond petawatt as the current high-energy lasers are often far from the diffraction limit in the beam-quality.

SUMMARY OF THE INVENTION

The present invention provides a quasi-parametric amplifier (QPA) for chirped pulses, which inhibits the back-conversion effect and enables the signal amplification with high conversion efficiency and broad gain bandwidth.

One inherent characteristic of the quadratic nonlinear interaction is that it allows both forward and backward energy transfer among the three interacting waves. That is, the OPA process (pump→signal+idler) and its inverse process of the sum-frequency generation (SFG) (signal+idler→pump) may occur in the same nonlinear crystal that is transparent at all the pump, signal, and idler waves. Such back-conversion effect is detrimental to the signal efficiency. By introducing material loss at the idler frequencies, the back-conversion is fundamentally prohibited because the back-conversion process requires the presence of idler photons to be effective. In this way, the amplifier behaves similarly to a non-parametric process, which is called a "quasi-parametric amplifier." The present invention provides a quasi-parametric chirped-pulse amplifier comprising three units: a signal path, a pump path, and an amplifier. The signal path successively comprises a Ti:sapphire regenerative amplifier, a pulse stretcher, and a pulse compressor. The pump path successively comprises a Nd:YVO$_4$ regenerative amplifier, a Nd:YAG boost amplifier, an image-relay system, a nonlinear crystal for second-harmonic generation (SHG), and a beam dump. The time jitter between the signal and pump pulses is controlled by an electronic phase-locking loop. The amplifier comprises a nonlinear crystal doped with rare-earth-ions. Both the chirped signal pulse from the pulse stretcher and the pump pulse from the SHG crystal incident into the amplifier, where energy continuously transfers from the pump pulse to the signal pulse and a newly generated idler pulse. The residual pump energy is collected by a beam dump, the energy of the generated idler pulse is continually absorbed by the rare-earth ions doped in the amplifier, and the amplified chirped signal pulse is compressed by the pulse compressor.

In the present invention, the nonlinear crystal in the amplifier is doped with rare-earth ions that may absorb the idler pulse, such as $Sm^{3+}$ and $Gd^{3+}$, with the doping concentration of >10 at %.

In the present invention, a dedicated crystal with idler absorption is used in lieu of a conventional crystal in an OPA. The major advantage of the OPA such as broad gain bandwidth applies here as well, but the device of the present invention offers many additional benefits due to the absence of back-conversion: high signal efficiency toward theoretical limit and robustness against phase-mismatch.

In the saturation regime, the QPA exhibits nonparametric features as a laser amplifier with high signal efficiency approaching the theoretical limit and robustness against phase mismatch. In the small-signal regime, the QPA still exhibits the conventional parametric amplification.

Due to the inhibition of the back-conversion effect, the QPA has remarkable advantages of high conversion efficiency toward the quantum limit and robustness against phase mismatch, thereby relaxing the requirement on environmental temperature, beam divergence and pointing.

The QPA is compatible with the technique of non-collinear phase-matching, so it may support a broad gain bandwidth with simultaneous signal amplification.

Remarkable efficiency and bandwidth properties, seen separately in conventional laser amplification and OPA, may be simultaneously acquired for QPA. It may overcome the limit of current technologies, and is promising for amplifying chirped pulse to much higher power level.

The quasi-parametric amplifier of the present invention exhibits nonparametric features as a laser amplifier, with high signal efficiency approaching the theoretical limit and robustness against phase mismatch; in the small-signal regime, it still belongs to the conventional parametric amplification. It has the main advantages of both the laser amplifier and the optical parametric amplifier, and can pave the way toward the design of ultra-high peak-power lasers.

These and other objectives, features, and advantages of the present invention become apparent from the following detailed description, the accompanying drawings, and the appended claims.

BRIEF DESCRIPTION OF THE DRAWINGS

FIG. 1(a) shows the signal efficiency $\eta_s$ versus crystal length z for a spatiotemporal Gaussian pump, and the solid (dashed) curve represents the QPA (OPA) with idler absorption of $\alpha L_{n1}=2$ (0); FIG. 1(b) shows the signal efficiency with a spatiotemporal, 4th-order, super-Gaussian pump, and the solid (dashed) curve represents the QPA (OPA) with a phase mismatch of $\Delta k L_{n1}=2$ (0), and the horizontal dotted lines in FIGS. 1(a) and 1(b) represent the theoretical efficiency limit ($\omega_s/\omega_p$); FIG. 1(c) shows the output signal energy $E_s$ for $\Delta k L_{n1}=800$, and the solid (dashed) curve represents the QPA (OPA), with the inset: signal evolution of the QPA over the first 0.2 mm; FIG. 1(d) shows the output signal energy versus the input signal energy (black square) and its fitting by the formula given in the text (line); FIG. 1(e) shows the normalized signal efficiency $\eta_s$ (dashed), idler efficiency $\eta_i$ (dotted), and residual pump energy $E_p(z)$ (solid), where $\omega_m$ is the angular frequency (m=p, s, i), and all the parameters in FIGS. 1(d) and 1(e) are the same as those of the QPA in FIG. 1(a).

FIG. 3(a) shows the measured absorption spectrum of Sm:YCOB along the direction of $\theta=28°$ and $\phi=180°$, and the shaded area represents the wavelength range spanned by the idler wave in the embodiment, with the Inset: a photograph of the as-grown Sm:YCOB crystal; FIG. 3(b) shows the measured gain spectrum of a 30-mm-long Sm:YCOB crystal at a pump intensity of ~2.8 GW/cm².

FIG. 4 shows the main experimental results of the QPA in one preferred embodiment of the present invention: FIG. 4(a) shows the signal efficiency versus seed intensity for the OPA (circles) and the QPA (squares); FIG. 4(b) shows the normalized signal efficiency as a function of the phase mismatch ΔkL for OPA (circles) and QPA (squares), where both measurements are performed at their highest efficiencies; FIG. 4(c) and FIG. 4(d) show the recorded signal spectra of the OPA (QPA), with the dashed (solid) curve corresponds to a seed intensity of 6.5 (325) kW/cm²; the grey region represents the seed signal spectrum; FIG. 4(e) and FIG. 4(f) show the compressed and Fourier-limited pulses in the OPA (QPA) for a seed intensity of 6.5 (325) kW/cm².

Reference numbers in the figures correspond to the following structures: 1: Ti:sapphire regenerative amplifier; 2: pulse stretcher; 3: chirped signal pulse; 4: nonlinear crystal doped with rare-earth-ions; 5: idler pulse; 6: beam dump; 7: pulse compressor; 8: electronic phase-locking loop; 9: Nd:YVO₄ regenerative amplifier; 10: Nd:YAG boost amplifier; 11: image-relay system; 12: crystal for SHG; 13: pump pulse.

DETAILED DESCRIPTION OF THE PREFERRED EMBODIMENT

The present invention is further explained in details with the accompanying drawings.

Figure 1:
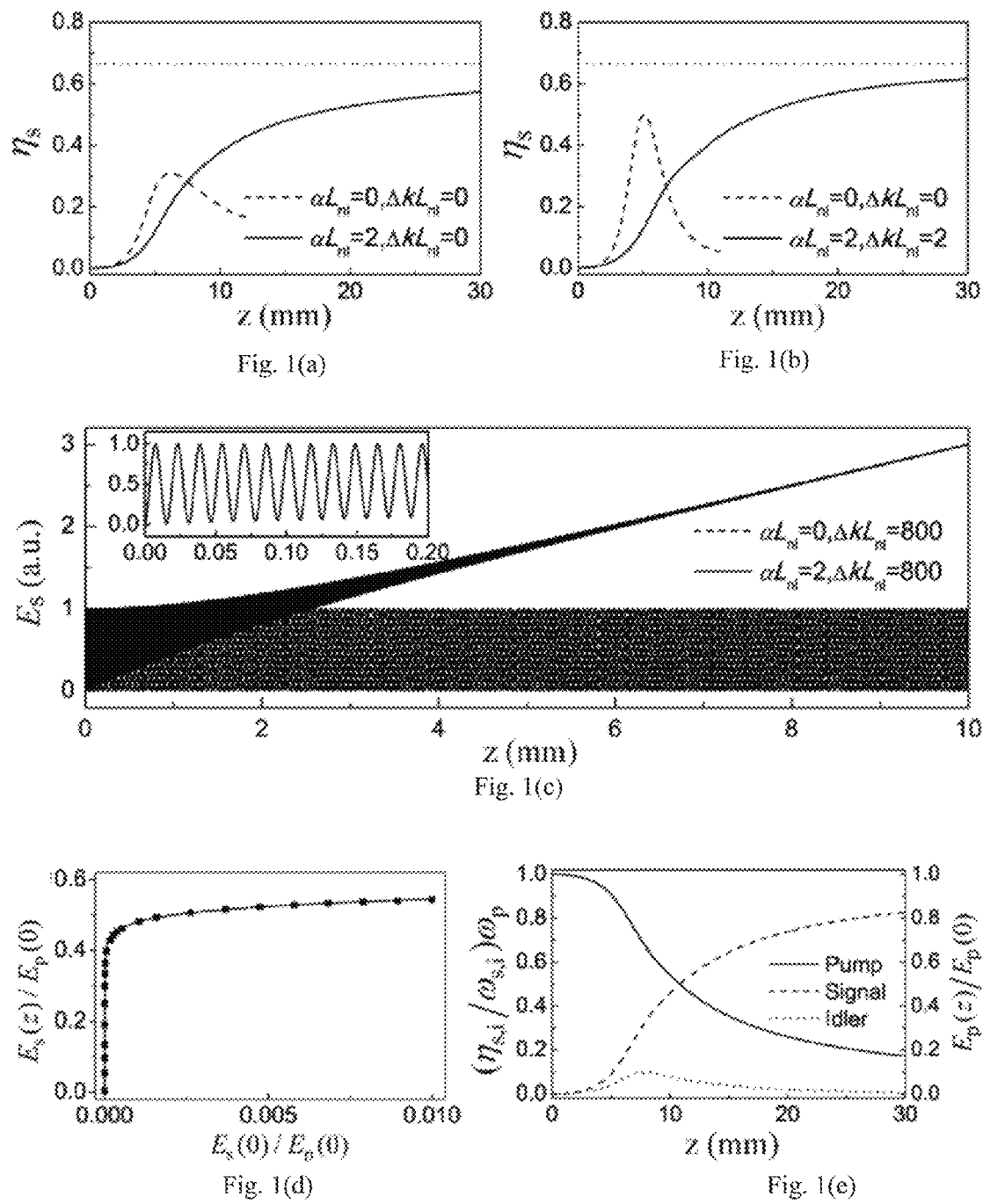
FIG. 1 shows numerical simulation results of the QPA.

Referring to FIG. 1(a) to FIG. 1(e) of FIG. 1, the conceptual basis of our proposed QPA scheme is OPA, which is theoretically addressed first by focusing on the back-conversion effect. Standard nonlinear coupled-wave equations in full dimensions, numerically solved by the symmetrized split-step Fourier method, are adopted for the simulations shown in FIG. 1, where the crystal absorption at idler (absorption coefficient is a) is included. In the simulations, all the linear effects (i.e., diffraction, dispersion, temporal, and spatial walk-off) are neglected. The wavelengths of the three interacting waves are set to 532 nm (pump), 810 nm (signal), and 1,550 nm (idler), respectively. Thus, the theoretical efficiency limit of the signal is around 66% as indicated by the horizontal dashed lines in FIGS. 1(a) and 1(b). Theoretically, a Gaussian pump laser is adopted in FIGS. 1(a), 1(c), 1(d), and 1(e), where a four-order Super-Gaussian pump laser is adopted in FIG. 1(b). In addition, the Gaussian seed intensity is set to 1% of the pump intensity; the beam width and pulse duration of the seed are the same as their counterparts of the pump. The nonlinear length $L_{n1}$ is fixed at 2 mm, which is a measure of the pump intensity or parametric gain. See J. Moses and S.-W. Huang, J. Opt. Soc. Am. B 28, 812 (2011). The phase mismatch is defined as $\Delta k = k_p - k_s - k_i$, where k is the wave number, and the indices p, s and i refer to the pump, signal, and idler, respectively.

In the OPA, nonlinear crystals that have been used in SFG are often utilised, and a phase-matching condition is shared with SFG that involves the same interacting waves. Thus, the OPA based on conventional transparent crystals will transit to the SFG of the signal and idler waves in the saturation regime as shown in dashed line in FIG. 1(a). The back-conversion effect is detrimental to the conversion efficiency. Although the OPA efficiency may be improved using spatiotemporal flat-top pump pulses, back-conversion still occurs and severely degrades the conversion efficiency as shown in dashed line in FIG. 1(b). In the QPA, the back-conversion effect may be fundamentally inhibited by depleting the idler wave with strong absorption, irrespective of the pump laser profile. Thus, the signal monotonically increases to approach its theoretical efficiency limit as the crystal length increases as shown in solid line in FIG. 1(a). It is equally important that the efficient signal pulse amplification is robust against phase mismatch as shown in solid line in FIG. 1(b), thereby relaxing the strict requirements on pump lasers. The intriguing features of the QPA may be better illustrated using the evolution of the signal intensity for a large phase mismatch as shown in FIG. 1(c). In the parametric process of the OPA without idler absorption, the signal regularly oscillates across the entire crystal, exhibiting a periodic transition between the OPA and SFG. By contrast, the signal in our scheme oscillates only initially as shown inset in FIG. 1(c) and gradually increases as in a nonparametric process. These characteristics have led us to term our scheme quasi-parametric amplification.

To further characterize the proposed QPA, the input-output relation for the signal pulse energy is studied. As presented in FIG. 1(d), the numerical simulation results may be well fitted by formula $E_s(z) = E_{sat} \ln\{1 + G_0[\exp(E_s(0)/E_{sat}) - 1]\}$ from a typical laser amplifier, where $E_{sat}$ and $G_0$ are the saturated energy flux and small-signal gain respectively. Therefore, the QPA behaves similarly to a nonparametric process. In addition, the Manley-Rowe relation between signal and pump is still satisfied in QPA. Different from the conventional OPA, the idler in the QPA no longer obeys the Manley-Rowe relations due to its strong absorption as shown in FIG. 1(e).

Figure 2:
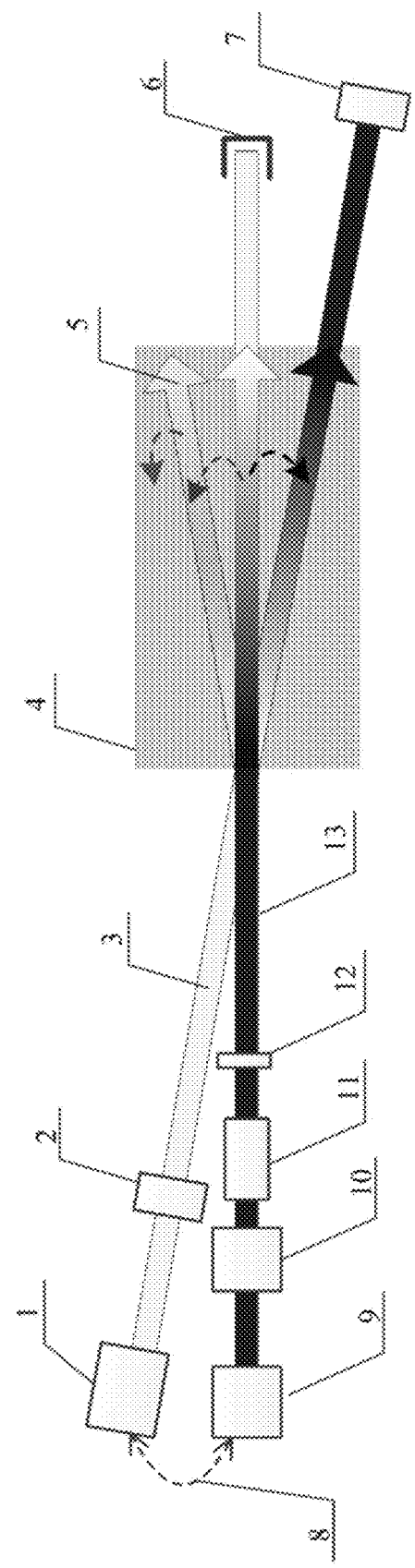
FIG. 2 is a structure diagram showing the quasi-parametric chirped-pulse amplifier of the present invention.

FIG. 2 is a structure diagram showing the quasi-parametric chirped-pulse amplifier of the present invention which comprises a signal path, pump path, and amplifier. The signal path successively comprises Ti:sapphire regenerative amplifier 1, pulse stretcher 2, and pulse compressor 7. The pump path successively comprises Nd:YVO₄ regenerative amplifier 9, Nd:YAG boost amplifier 10, image-relay system 11, crystal for SHG 12, and beam dump 6. The time jitter between the Ti:sapphire regenerative amplifier 1 and Nd:YVO$_4$ regenerative amplifier 9 is controlled by an electronic phase-locking loop 8. The amplifier comprises a nonlinear crystal doped with rare-earth-ions 4. Both the chirped signal pulse 3 from the pulse stretcher 2 and the pump pulse 13 from the SHG crystal 12 incident into the amplifier, where energy continuously transfers from the pump pulse 13 to the chirped signal pulse 3 and a newly generated idler pulse 5. The residual pump energy 13 is collected by a beam dump 6. The energy of the generated idler pulse 5 is continually absorbed by the rare-earth ions in the crystal 4. The amplified chirped signal pulse 3 is compressed by the pulse compressor 7.

Figure 3:
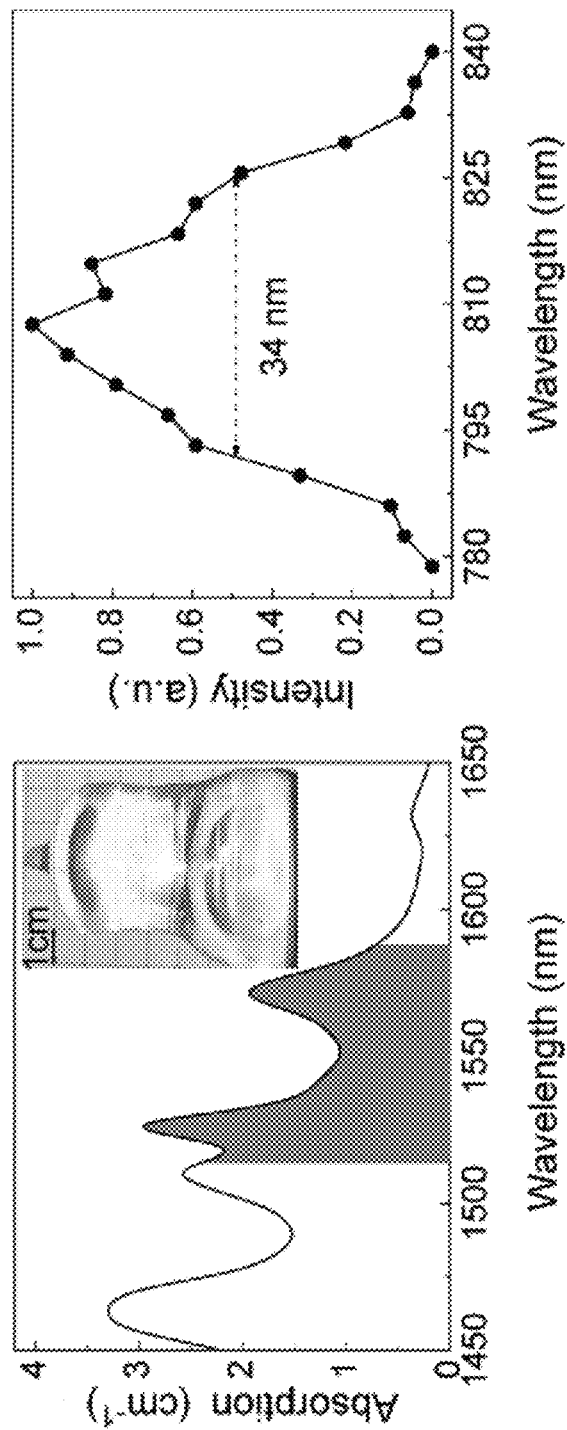
FIG. 3 shows measured absorption spectrum and gain spectrum of the nonlinear crystal Sm:YCOB used in one preferred embodiment of the present invention.

According to the wavelength of the idler pulse 5, the nonlinear crystal may be doped with different types of rare-earth ions, such as $Sm^{3+}$ and $Gd^{3+}$, with the doping concentration of >10 at %. In the embodiment, the wavelengths of the pump pulse 13, chirped signal pulse 3, and idler pulse 5 are 532 nm, 810 nm and 1550 nm, respectively. The nonlinear crystal 4 is a $Sm^{3+}$-doped yttrium calcium oxyborate (Sm:YCOB) crystal, in which 30 at % $Y^{3+}$ is substituted by $Sm^{3+}$. FIG. 3(a) shows that the Sm:YCOB crystal exhibited a strong absorption of 1 to 2 $cm^{-1}$ around the idler wavelength of 1.55 which is suitable for the proposed QPA scheme. Importantly, the Sm:YCOB crystal has negligible absorption at the pump and signal wavelengths. A crystal sample with dimensions of 15.5×18.5×30 $mm^3$ is cut along the direction of $\theta=28°$ and $\phi=180°$ in the plane of xoz, and its effective nonlinear coefficient is measured to be ~0.9 pm/V. One surface of the crystal is wedged by 2° to suppress the parasitic double-pass amplification. Both crystal surfaces are optically polished and uncoated. For an intersection angle of 2.8° between the interacting beams and a crystal orientation of $\theta=28°$ and $\phi=180°$, type I non-collinear phase-matching for a 30-mm-long crystal experimentally support a signal gain bandwidth of 34 nm, centred at 810 nm as shown in FIG. 3(b).

The experimental configuration in the embodiment comprises a single-stage QPA using a 30-mm-long Sm:YCOB crystal. The pump laser system is composed of a Nd:YVO$_4$ laser regenerative amplifier 9, a 10-Hz Nd:YAG boost amplifier 10, and a 5-mm-thick β-BBO crystal for SHG 12. The laser system provided 75-mJ green pulses with a temporal duration of 420 ps. The seed signal is produced by a femtosecond Ti:Sapphire regenerative amplifier 1, whose time jitter (~10 ps) relative to the pulses generated by Nd:YVO$_4$ laser regenerative amplifier 9 is controlled by an electronic phase-locking loop 8. A single-grating, double-pass Öffner pulse stretcher 2, is adopted to produce 0.5-mJ chirped seed pulses 3 with a duration of 380 ps and a spectrum ranging from 795 to 825 nm as shown by the shadows in FIGS. 4(c) and 4(d).

Both the QPA and a conventional OPA using a β-BBO crystal are experimentally characterized at a fixed pump intensity of ~2.8 GW/$cm^2$ as shown in FIGS. 4(a) and 4(b). In our experiments, the seed intensity is varied over six orders of magnitude to adjust the degree of amplification saturation. For comparison, the length of the β-BBO crystal is set to 12 mm to obtain a small-signal gain ($5\times10^6$) similar to that of the QPA. As evidence of back-conversion, a significant drop is observed in the signal efficiency in the strong seed regime of OPA as shown in dashed line in FIG. 4(a). Thus, the maximum signal efficiency is limited to only 17% in our case. However, a strong seed may always be used to boost the signal efficiency in QPA. The solid line in FIG. 4(a) shows that the signal continued to increase over the entire range of available seed intensities, indicating that the back-conversion effect is obstructed by QPA. The evolution of the signal spectrum for varying seed intensities are also studied as shown in FIGS. 4(c) and 4(d). The recorded signal spectrum in the saturated QPA regime exhibits a large dip in the centre that overlaps with the peak of the pump pulses during the amplification, providing another indication that back-conversion has occurred. However, the signal spectrum in the QPA has broadened and flattened as the seed intensity has increased. Such amplified signal pulses from the QPA may be effectively compressed to near the Fourier-transform limit, whose duration of 90 fs is similar to that for OPA as shown in FIGS. 4(e) and 4(f). Another intriguing feature of the QPA is its robustness against the phase mismatch. FIG. 4(b) shows that the QPA has withstood a large phase mismatch of $\Delta kL\approx10$ with a negligible decrease in efficiency, whereas the OPA is more sensitive to the phase mismatch. The result implies that QPA should be insensitive to variations in the environmental temperature, beam divergence, and pointing.

Figure 5:
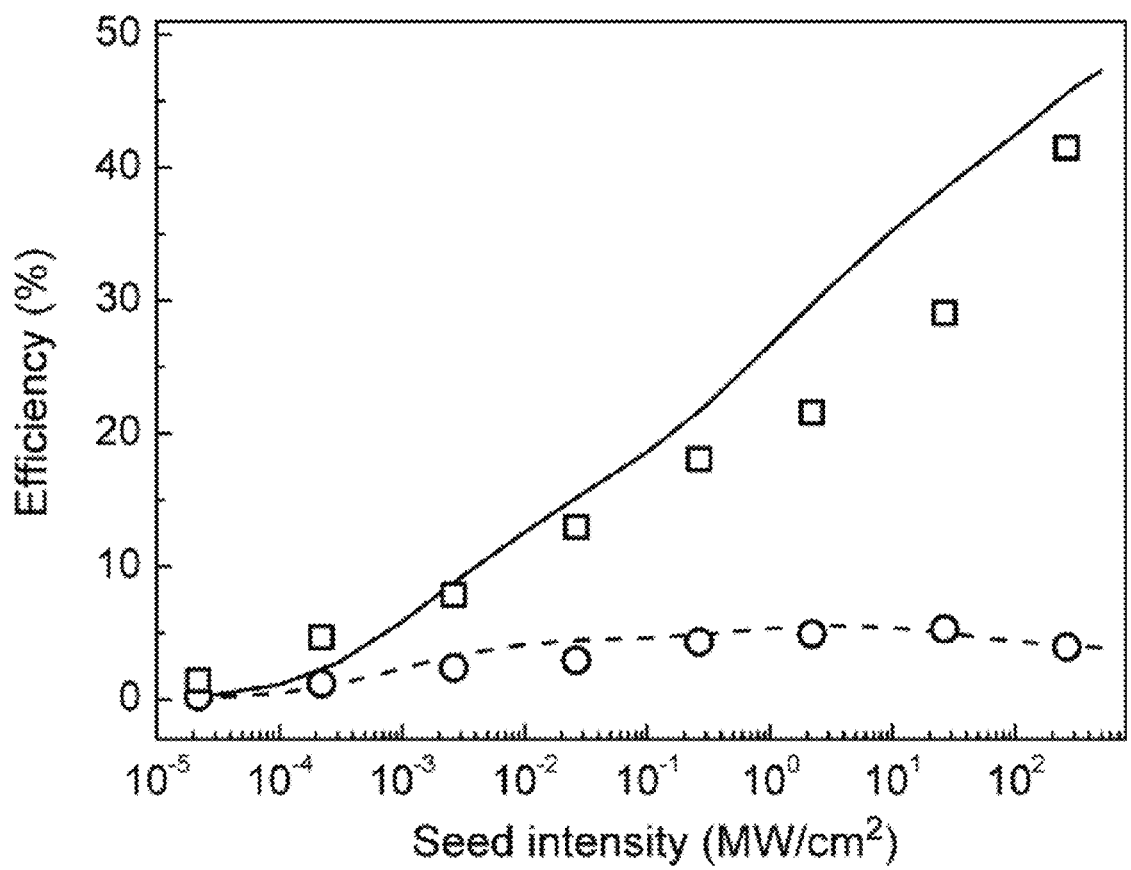
FIG. 5 shows the measured signal (open squares) and idler (open circles) efficiency versus seed intensity for QPA, and the solid (dashed) dashed line is the theoretically predicted signal (idler) efficiency.

Finally, the QPA efficiency is shown to be boosted by a stronger seed, which is obtained by using a smaller beam size. FIG. 5 shows both the signal and idler efficiency at a pump intensity of 3 GW/$cm^2$. Because of the strong absorption, the idler efficiency is considerably lower than that suggested by the Manley-Rowe relations. Although there are some discrepancies between the measurements and calculations, the measured signal efficiency shows a similar increasing tendency with the calculation and again does not present the back-conversion effect in a large variation range of the seed intensity. In the experiment, signal efficiency as high as 41% is achieved at the maximum available seed intensity of 260 MW/$cm^2$. The actual signal efficiency would have been 47% for the inner crystal if an additional 13% loss due to surface reflections is considered. In our high-efficiency QPA, approximately 70% of the pump energy is down-converted, which is determined by directly measuring the residual pump energy as well as deducing from the signal efficiency. The obtained efficiency exceeds that of the previously reported state-of-the-art OPA. Neither a spatiotemporally flat profile for the pump pulses nor signal spectral shaping is required.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

We claim:
1. A quasi-parametric chirped-pulse amplifier, comprising
a signal path,
a pump path, and
an amplifier,
wherein the signal path successively comprises a Ti:sapphire regenerative amplifier, a pulse stretcher, and a pulse compressor;
the pump path successively comprises a Nd:YVO$_4$ regenerative amplifier, a Nd:YAG boost amplifier, an image-relay system, a crystal for second harmonic generation (SHG), and a beam dump, and a time jitter between the

Ti:sapphire regenerative amplifier and the Nd:YVO$_4$ regenerative amplifier is controlled by an electronic phase-locking loop;

the amplifier comprises a nonlinear crystal doped with rare-earth-ions, and both a chirped signal pulse from the pulse stretcher and a pump pulse from the crystal for SHG incident into the amplifier, where energy continuously transfers from the pump pulse to the chirped signal pulse and a newly generated idler pulse;

residual energy of the pump pulse is collected by the beam dump;

energy of the generated idler pulse is continually absorbed by the rare-earth ions in the nonlinear crystal; and the amplified chirped signal pulse is compressed by the pulse compressor.

2. The quasi-parametric chirped-pulse amplifier according to claim 1, wherein the nonlinear crystal is doped with one or more types of rare-earth ions to absorb the idler pulse and thereby inhibits the back conversion effect.

3. The quasi-parametric chirped-pulse amplifier according to claim 1, wherein the nonlinear crystal is doped with the rare-earth ions with a doping concentration of more than 10%.

4. The quasi-parametric chirped-pulse amplifier according to claim 1, wherein the nonlinear crystal is doped with rare-earth ions at different concentration determined according to the wavelength of the idler pulse.

5. A method for inhibiting back-conversion effect in ultrafast laser amplification according to claim 1, comprising using the quasi-parametric chirped-pulse amplifier of claim 1, and depleting an idler wave in a parametric process.

* * * * *